United States Patent [19]
Al-Salameh et al.

[11] Patent Number: 5,742,774
[45] Date of Patent: Apr. 21, 1998

[54] MULTI-RING SONET ARCHITECTURE HAVING SHARED GATEWAYS DAISY CHAINED TO COMPLETE THE MAIN AND SUBSIDIARY RING CONTROLLED BY A COMMON MASTER CONTROLLER

[76] Inventors: Daniel Yousef Al-Salameh, 12 Susan Dr., Marlboro, N.J. 07746; Nicholas Paul DeVito, 9 Ski Hill Dr., Bedminster, N.J. 07921; Philip M. Francisco, 32 Bridge St., Groton, Mass. 01450; Steven H. Hersey, 5 Waterside La., West Newbury, Mass. 01985; Wilhelm Kremer, 3 Sugarbush La., Andover, Mass. 01810

[21] Appl. No.: 605,937

[22] Filed: Feb. 23, 1996

Related U.S. Application Data

[63] Continuation of Ser. No. 552,898, Nov. 3, 1995, abandoned.

[51] Int. Cl.⁶ .............................. H04L 12/42; H04L 12/46
[52] U.S. Cl. .................... 395/200.81; 395/200.79; 370/401
[58] Field of Search ...................... 320/285, 400, 320/401, 402, 404, 405, 406; 395/200.68, 200.74, 200.66, 200.5, 200.79, 200.81

[56] References Cited

U.S. PATENT DOCUMENTS

| | | | |
|---|---|---|---|
| 4,999,832 | 3/1991 | Chen et al. | 370/369 |
| 5,107,490 | 4/1992 | Wilson et al. | 370/85.3 |
| 5,396,493 | 3/1995 | Sugiyama | 395/200.15 |
| 5,406,549 | 4/1995 | Kremer | 370/16.1 |
| 5,412,652 | 5/1995 | Lu | 370/85.12 |
| 5,477,530 | 12/1995 | Ahmadi et al. | 370/16.1 |
| 5,504,747 | 4/1996 | Sweazey | 370/85.14 |
| 5,515,367 | 5/1996 | Cox, Jr. et al. | 370/60.1 |

OTHER PUBLICATIONS

Sales Literature, FT 2000 OC 48 Light Wave System, AT&T Feb. 1994.

M. Kaplan, "Rings Take Flight," *Telephony* Aug. 7, 1995 pp. 22–31.

*Primary Examiner*—Dinh C. Dung
*Attorney, Agent, or Firm*—Steven R. Bartholomew; Robert B. Levy

[57] ABSTRACT

A pair of SONET rings (12' and 14') can be interworked by providing at least two gateways ($16_{m-1}$ and $16_m$) that are shared by each of the rings. Each shared gateway has the capability of transferring a block of optical information resident in a prescribed time slot in an interchange frame associated with one ring to a time slot in an interchange frame associated with the other ring so the block reaches its intended destination in that ring.

4 Claims, 2 Drawing Sheets

INTERCHANGE FRAME

MULTI-RING SONET ARCHITECTURE HAVING SHARED GATEWAYS DAISY CHAINED TO COMPLETE THE MAIN AND SUBSIDIARY RING CONTROLLED BY A COMMON MASTER CONTROLLER

This application is a continuation of U.S. application Ser. No. 08/552,898, Filed Nov. 3, 1995, now abandoned.

TECHNICAL FIELD

This invention relates to a Synchronous Optical NETwork (SONET) architecture that is characterized by a plurality of interlinked fiber rings.

BACKGROUND ART

Presently, Synchronous Optical Network (SONET) rings are employed to carry inter-city telecommunications traffic. A typical SONET ring comprises a plurality of hubs or nodes, each coupled to another by at least one optical fiber link. At each node, a gateway converts an incoming electrical signal that may be associated with a telephone call into a block of optical information. The gateway places the block of optical information onto the ring within a particular time slot of an interchange frame having a particular synchronization (speed). Each time slot in each frame corresponds to a particular destination (i.e., node) within the ring. Thus, the gateway at each node converts the block of information appearing within the time slot associated with that node into corresponding electrical signals. In this way, traffic on the ring is routed in automatically.

Connecting a large number of nodes (i.e., gateways) in a single ring is often impractical. Rather, some nodes may be organized in smaller (subsidiary) rings that are connected to each other by a backbone ring to minimize the length of the fiber links. Each subsidiary ring is typically interlinked (interworked) to the backbone ring at a pair of nodes. In the past, such interworking was accomplished by providing means at each interworked node of the subsidiary ring to convert a block of optical information into corresponding electrical signals. These electrical signals are transmitted to a corresponding interworked node of the backbone ring for conversion into a block of optical information for transmission onto the backbone ring within a particular time slot associated with the destination of that information block. Information is passed from the backbone ring to a subsidiary ring in the same manner as described above.

In practice, the subsidiary and backbone rings must be controlled separately, making provisioning cumbersome. Thus, to provide a customer with end-to-end conductivity, it may be necessary to provision a large number of rings. Moreover, the equipment needed at the interworked hubs to convert each block of optical information into corresponding electrical signals and to convert the electrical signals into a corresponding block of optical information is expensive and increases the overall complexity of the transmission network, thereby decreasing its reliability.

Thus, there is a need for SONET ring architecture that overcomes the foregoing disadvantages.

BRIEF SUMMARY OF THE INVENTION

Briefly, the present invention concerns an optical fiber transmission system comprising at least one main ring and subsidiary ring. Each main ring comprises m (where m is an integer greater than two) nodes linked to each other in daisy-chain fashion by m first optical fiber links. At each of m–2 first nodes is a first gateway at which incoming electrical signals are converted into at least one block of optical information synchronized to a first interchange frame so the block resides in a particular time slot in the frame associated with its ultimate destination. Each first gateway also converts each block of information reaching that gateway in a time slot associated therewith into corresponding electrical signals. Each subsidiary ring comprises n (where n is an integer greater than two) second nodes that are coupled to each other in daisy-chain fashion by n second optical fiber links. At each of n–2 second nodes of each subsidiary ring is a second gateway at which electrical signals are converted into at least one block of optical information synchronized to a second interchange frame so each block resides in a particular time slot in that frame associated with its ultimate destination. Each second gateway also converts each block of information reaching that gateway in the time slot in the second interchange associated therewith into corresponding electrical signals In accordance with the invention, each of the two n nodes and each of the two m nodes that lack individual gateways share a third gateway. Each third gateway shared by one of the m and n nodes converts incoming electrical signals into at least one block of optical information synchronized to an interchange frame so the block resides in a particular time slot associated with its destination within one of the main and subsidiary rings. Each third gateway serves to convert a block of information reaching that gateway within a time slot associated therewith into corresponding electrical signals. In addition, at least one third gateway shared by one of the m and n nodes transfers a block of information that is destined for another gateway in another ring by transferring the block from its current time slot in its current interchange frame to a time slot in an interchange frame associated with the destination of the block. In this way, the third gateway transfers a block of information from the main ring to a subsidiary ring and vice versa.

In accordance with another aspect of the invention, the first, second and third gateways are all controlled by a single master controller capable of programming each gateway. In particular, the master controller controls which time slot in a corresponding interchange frame is associated with a particular gateway, thereby altering the routing of information blocks on each ring. By controlling the gateways in this way, the controller can jointly provision as well as administer and maintain both the main and subsidiary rings.

DETAILED DESCRIPTION

Figure 1:
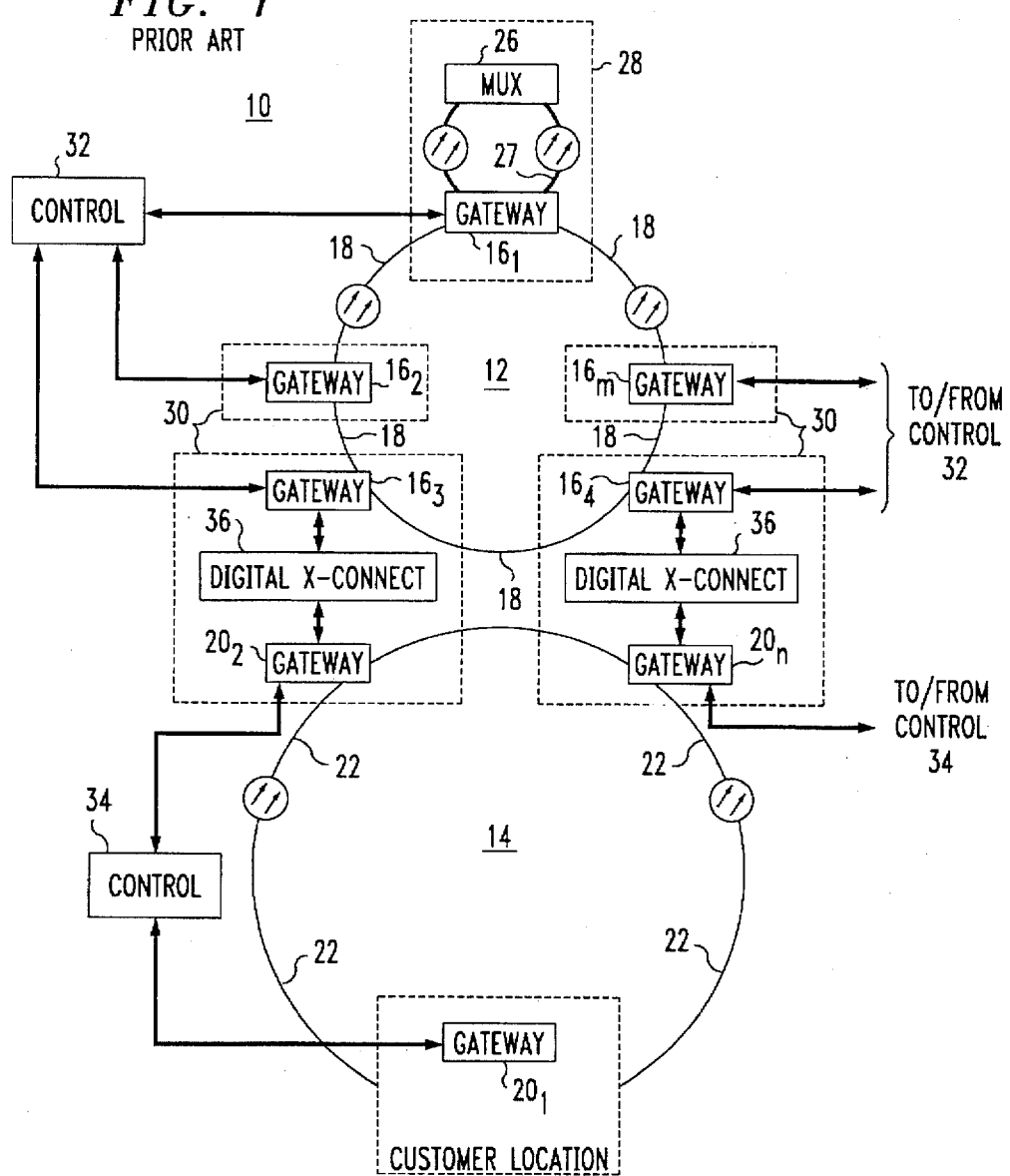
FIG. 1 is a block diagram of an optical fiber transmission according to the prior art.

FIG. 1 illustrates a prior art optical fiber transmission network 10 comprising part of a larger telecommunications network. The network 10 comprises a plurality of SONET rings, with two such rings 12 and 14 being shown in the figure. The ring 12 comprises m nodes $16_1$–$16_m$ (where m is an integer greater than two), each node linked to another in a daisy chain fashion by a set of optical fiber links 18—18. The ring 14 is constructed similarly to the ring 12 and comprises n nodes $20_1$–$20_n$ (where n is an integer), each node linked to another in a daisy chain fashion by a set of optical fiber links 22—22. In practice, each gateway in each of the rings 12 and 14 may be linked to an adjacent gateway in the same ring by at least two optical fiber links only one of which is shown in FIG. 1. One link is typically used to carry normal or service traffic while the other link remains in reserve for use during service disruptions.

Figure 2:
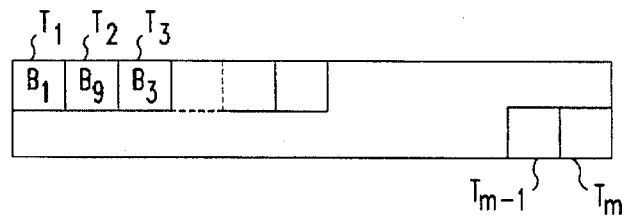
FIG. 2 is a block diagram of an interchange frame according to the prior art.

Each of the nodes $16_1$–$16_m$ comprises a gateway, typically in the form of a fiber terminal, capable of converting electrical signals, such as those carrying telecommunications traffic, into at least one block of optical information. Each block of optical information generated by each of the gateways $16_1$–$16_m$ is synchronized to a separate interchange frame 24 (shown in FIG. 2) that is associated with the ring 12. Referring to FIG. 2, each interchange frame 24 comprises a time interval of a prescribed duration (typically 125 microsecond) that is divided into a plurality of time slots $T_1$–$T_m$. Each block of optical information generated by each of the gateways $16_1$–$16_m$ occupies a particular one of the time slots $T_1$–$T_m$ in accordance with the intended destination node for that information block within the ring. The gateway at the intended destination node converts the block of information in the corresponding time slot associated with that node into a set of electrical signals.

Referring to FIG. 2, a block of information $B_1$ is placed in the time slot $T_1$ of the interchange frame 24 when the block is destined for the gateway associated with that time slot. In a similar manner, the information block $B_9$ intended for another destination gateway would occupy time slot $T_2$ associated with that destination gateway. In practice, the ring 12 may comprise an OC-48 ring whose interchange frames each have 48 separate slots.

Referring to FIG. 1, the gateways $16_1$–$16_m$ typically each comprise an AT&T model FT 2000 fiber terminal that operates to generate the blocks of optical information for passage along the ring 12 and to convert each block arriving at the gateway into a set of corresponding electrical signals. In practice, the gateway $16_1$ may be supplied with telecommunications traffic via a multiplexer 26 across an optical fiber link 27. Together, the multiplexer 26 and gateway $16_1$ may serve as a point of presence 28 of a interexchange carrier, such as AT&T, within a Local Exchange Carrier (LEC). Each of the remaining gateways $16_2$–$16_m$ is typically situated within a Local Service Offices(LSO) 30 of the LEC. In this way, telecommunications traffic may pass between any of the LSOs 30—30 and the IXC POP 28 across the ring 12.

A master controller 32, typically a digital computer or the like, controls each of the gateways $16_1$–$16_m$ by programming each gateway to respond to a particular time slot within the interchange frame 24 of FIG. 2. By programming each of the gateways $16_1$–$16_m$ in this manner, the master controller 32 can effectively provision, as well as administer and control the ring 12 by controlling the destination of the information blocks within the ring.

The ring 14 typically operates in much the same manner as the ring 12. Each of the gateways $20_1$–$20_n$ comprises a device such as a digital multiplexer that converts electrical signals into at least one block of optical information that is synchronized to an interchange frame (not shown) that may have the same or different synchronization as the frame 24. Each block of information generated by each of the gateways $20_1$–$20_n$ occupies a specific slot in the interchange frame in accordance with the intended destination of the block within the ring 14. Typically, the gateway $20_1$ is situated at a customer premises, whereas the gateways $20_2$–$20_n$ are each situated at one of a set of LSOs 30—30. In practice, the ring 14 may be an OC-3 ring having only three slots (i.e., n=3) within each interchange frame. Thus, the ring 14 typically has a synchronization that is different (e.g., slower) than the ring 12.

Like the ring 12, the ring 14 includes a master controller 34 that controls the gateways $20_1$–$20_n$ by programming each gateway with respect the time slot to which it responds. Thus, the master controller 34 provisions, as well as administers and maintains the ring 14 in much the same way that the master controller 32 provisions, the ring 12.

In many instances it may be desirable to pass a block of information traveling on one of the rings 12 and 14 to the other ring. To that end, a pair of gateways $16_1$–$16_m$ is interworked (interlinked) to pair of gateways $20_1$–$20_n$. In the illustrated embodiment of FIG. 1, the nodes $16_3$ and $16_4$ are interworked with the nodes $20_1$ and $20_n$, respectively. In accordance with the prior art, each of the nodes $16_3$ and $16_4$ is interworked to a corresponding one of the nodes $20_1$ and $20_n$ by a separate one of a pair of digital cross-connect devices 36—36, typically DACS IV-2000 cross-connect systems manufactured by AT&T. Each digital cross-connect device 36 carries electrical signals supplied from one of the pair of interworked gateways $16_3$ and $16_4$ to a corresponding one of the interworked gateways $20_1$ and $20_n$, respectively, and vice versa.

In order to route a block of optical information from ring 12 to ring 14, one of the gateways $16_3$ or $16_4$ will convert the intended block into electrical signals. The signals are then supplied to the corresponding one of the gateways $20_1$ and $20_n$ through an associated one of the digital cross-connect devices 36—36. The electrical signals received at the corresponding one of the gateways $20_1$ and $20_n$ are then converted back to an optical block of information for transmission along the ring 14. Each block of optical Information destined to pass from the ring 14 to the ring 12 is likewise converted into electrical signals at one of the gateways $20_1$ and $20_n$ for passage via one of the cross-connect devices 36—36 to a corresponding one of the gateways $16_3$ and $16_4$.

Interworking the rings 12 and 14 in this manner adds to the overall cost and complexity of network 10 because of the need to provide digital cross-connect systems 36 to carry electrical signal between the interworked nodes. Moreover, the dual ring interworking architecture described above with respect to FIG. 1 suffers the disadvantage that the rings 12 and 14, as well as the digital cross-connect devices 36—36, are provisioned separately, making it more difficult to achieve end-to-end connectivity.

Figure 3:
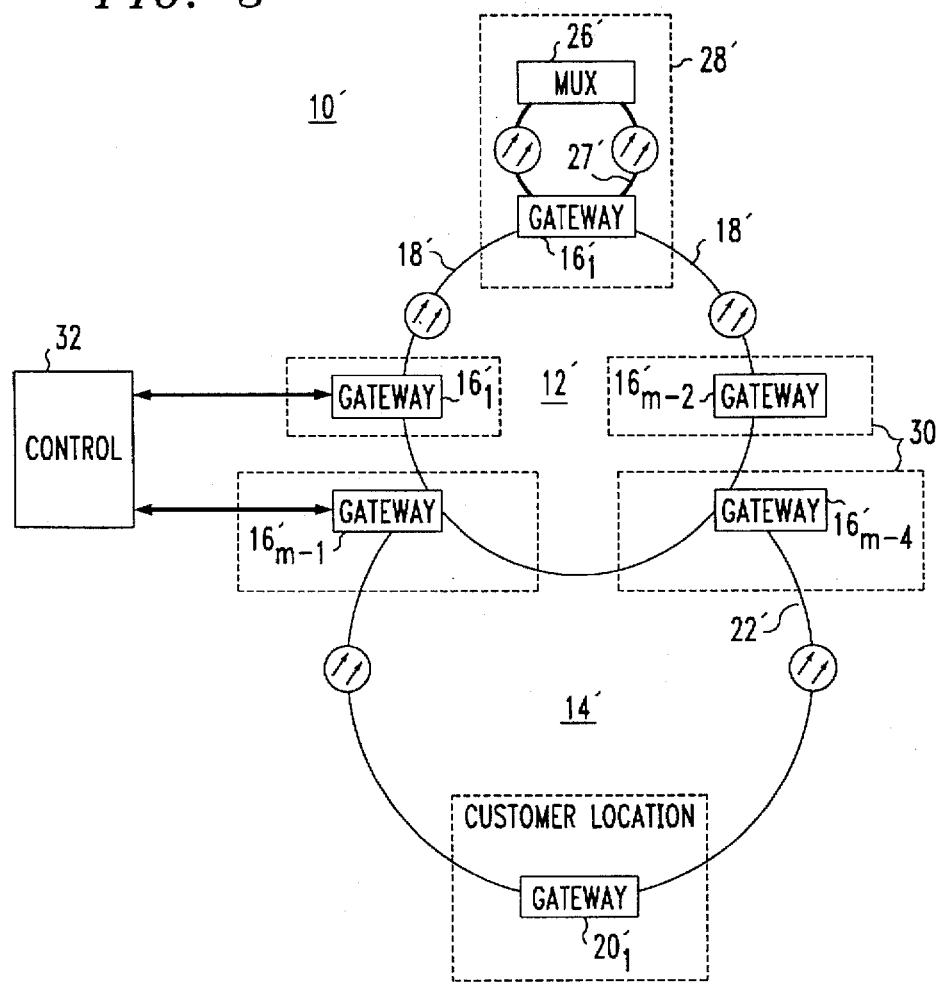
FIG. 3 is a block schematic diagram of an optical fiber transmission system in accordance with the invention.

Referring now to FIG. 3, there is shown an optical fiber transmission telecommunications network 10' in accordance with the invention. Like the network 10 of FIG. 1, the network 10' of FIG. 3 comprises at least two SONET rings 12' and 14'. The ring 12' comprises a plurality of m nodes where m is an integer greater than two. Unlike the ring 12 of FIG. 1 in which each node has its own of gateway, there are at most m–2 nodes within the ring 12' of FIG. 3 that have their own gateways $16'_1$–$16'_{m-2}$, respectively. Each node containing one of the discrete gateways $16'_1$–$16'_{m-2}$ is linked to another discrete gateway via an optical fiber link 18'. The gateway $16'_1$ of the ring 12' of FIG. 3 is typically coupled to a multiplexer 26' via an optical fiber link 27', which together serve as a POP 28' for an IXC in much the same way that the gateway $16_1$ and the multiplexer 26 of FIG. 1 comprise the POP 28. The remaining gateways $16'_2$–$16'_{m-2}$ are typically situated at LSOs 30'—30' just as the gateways $16_2$–$16_m$ reside at the LSOs 30—30 in FIG. 1.

Like the ring 14 of FIG. 1, the ring 14' of FIG. 3 comprises n nodes (where n is an integer greater than two) of which no more than n–2 nodes each have a discrete gateway 20. In the illustrated embodiment shown in FIG. 3, n=3 so that the ring 14' only contains a single discrete gateway $20'_1$ at a corresponding one of the three nodes. Typically, the gateway $20'_1$ serves as a customer gateway in much the same manner as the gateway $20_1$ of the ring 14 of FIG. 1.

Pursuant to the invention, at least two of the nodes of the ring 12' of FIG. 3 each share one of a pair of common gateways $16'_{m-1}$ and $16'_m$, respectively, with a pair nodes of the ring 14'. The common gateways $16'_{m-1}$ and $16'_m$ are each linked by an optical fiber link 18' to a separate one of the discrete gateways $16'_1$–$16'_{m-2}$ to form a daisy chain arrangement that comprises the ring 12'. In a similar fashion, each of the common gateways $16'_{m-1}$ and $16'_m$ is also linked by an optical fiber link 22' to the gateway $20'_1$ to form a daisy-chain arrangement that comprises the ring 14'. The common gateways $16'_{m-1}$ and $16'_m$ typically each reside at a separate one of the LSOs 30'—30'.

In practice, each of the common gateways $16'_{m-1}$ and $16'_m$ comprises a model FT 2000 fiber terminal that is controlled (i.e., programmed) from a master control 32' along with each of the gateways $16'_1$–$16'_{m-2}$ and the gateway $20'_1$. The master controller 32' typically comprises a digital computer or the like that is capable of programming each of the gateways $16'_1$–$16'_{m-2}$ and gateway $20'_1$ to respond to a particular time slot within each interchange frame associated with each ring in a manner similar to the manner in which the controllers 32 and 24 of FIG. 1 separately control the ring 12 and the ring 14 of FIG. 1. In addition, the master controller 32' also programs each of the common (shared) gateways $16'_{m-1}$ and $16'_m$ to respond to a "destination" time slot and an "interwork" time slot in each interchange frame associated with each ring. To understand the manner in which the master controller programs the common gateways $16'_{m-1}$ and $16'_m$, reference should be had to FIG. 4 that illustrates interchange frames 24' and 40' associated with the rings 12' and 14' in FIG. 3.

Information blocks are transmitted along the ring 12' of FIG. 3 in a plurality of synchronized interchange frames 24' (only one shown in FIG. 4), each frame comprised of a plurality of time slots $T_1$–$T_m$ each occupied by a separate block. Likewise, information blocks are transmitted along the ring 12' of FIG. 3 in a plurality of synchronized interchange frames 24' (only one shown in FIG. 4), each frame comprised of a plurality of time slots $T_1$–$T_m$, each occupied by a separate block.

For purposes of discussion, assume that the common gateway $16'_m$ is programmed by the controller 32' of FIG. 3 to respond to time slots $T_3$ and $T_a$ in the interchange frames 24' and 40', respectively, as destination time slots. For each block of information appearing in a separate one of these destination slots, the common gateway $16'_m$ converts the block into electrical signals for further processing at the corresponding LSO 30'. In this way, a block of information passes along each of the rings from an originating node to its destination node in the same ring.

Figure 4:
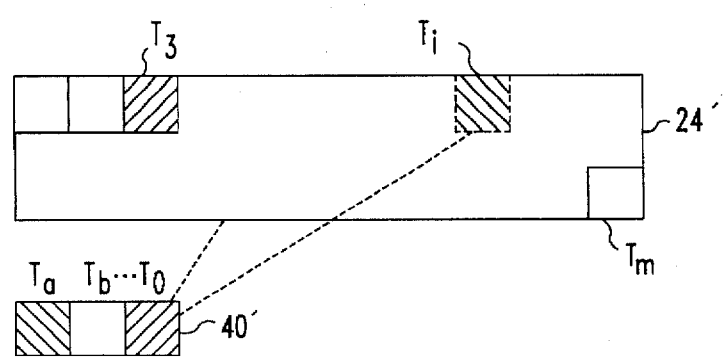
FIG. 4 is a block schematic diagram of a pair of interchange slots that illustrate how the transmission system of FIG. 3 transfers a block of information between slots.

Now assume that the common gateway $16'_m$ has been programmed by the controller 32' to respond to time slots $T_i$ and $T_n$ as interwork slots within the interchange frames 24' and 40', respectively, of FIG. 4. Upon receipt of a block of information in the interwork slot $T_i$ in the interchange frame 24' of FIG. 4, the common gateway $16'_m$ of FIG. 3 transfers the block of optical information to a corresponding time slot within the interchange frame 40' associated with the ultimate destination of that block in the ring 14' of FIG. 3. In a similar manner, the common gateway $16'_m$ responds to each block of information appearing in the time slot $T_n$ within the interchange frame 40' associated with the ring 14' of FIG. 3. Each block of information appearing in the time slot $T_n$ is transferred by the common gateway $16'_m$ to a corresponding time slot in the interchange frame 24' for transit on the ring 12' of FIG. 3 to its ultimate destination.

As compared to the prior art network 10 of FIG. 1, the network 10' according to the invention affords several distinct advantages. First, all of the gateways $16'_1$–$16'_m$ and the gateway $20'_1$ are controlled by the same master controller 32'. Thus, both of the rings 12' and 14' can be provisioned, as well as administered and maintained by the controller 32' at the same time. Further, the network 10' affords the advantage of providing the node $20'_1$ (the customer premises) with a fully redundant dual-homing arrangement (provided by the optical links linking the customer premises to the common gateways $16'_{m-1}$ and $16_m$). Additionally, the network 10' of FIG. 3 features the ability to transport information between rings with a minimum of hardware, thereby reducing capital expenses.

The network 10' of FIG. 3 has been found to afford another distinct advantage in terms of the restoration time, that is the amount of time expended to restore the network in the event of a service failure. Typical, the network 10 can be restored within ~35 milliseconds, whereas the restoration time for the network 10 are typically on the order of 110 milliseconds.

It is to be understood that the above-described embodiments are merely illustrative of the principles of the invention. Various modifications and changes may be made thereto by those skilled in the art which will embody the principles of the invention and fall within the spirit and scope thereof.

What is claimed is:

1. An optical fiber transmission system comprising:
   at least one main ring having m first nodes, no more than m–2 of which each contain a first gateway linked to another first gateway associated with another of said m–2 nodes via a first optical fiber link in a daisy chain configuration, each first gateway converting incoming electrical signals into a block of optical information synchronized to an interchange frame associated with the main ring so that said block resides in a time slot within the interchange frame associated with a destination within said main ring, and each first gateway being responsive to a particular time slot within said interchange frame for converting a block of information residing in said particular slot into outgoing electrical signals;
   at least one subsidiary ring having n first nodes, no more than n–2 of which each contain a second gateway, each second gateway converting incoming electrical signals into a block of optical information synchronized to an interchange frame associated with said subsidiary ring so that said block resides in a time slot within the interchange frame associated with a destination within said subsidiary ring, and each second gateway being responsive to a particular time slot within said interchange frame for converting a block of information residing in said particular slot into outgoing electrical signals; wherein the improvement comprises:

at least two third gateways each shared by one of the m and n nodes lacking first and second gateways, respectively, each third gateway linked by second optical fiber links to a pair of first gateways in daisy chain fashion to complete said main ring and the third gateways linked by third optical fiber links to at least one second gateway in a daisy chain fashion to complete said subsidiary ring, each third gateway converting a block of information destined for that gateway into corresponding electrical signals, and at least one third gateway transferring a block of information for another gateway in another ring by transferring the block from its current time slot in its current interchange frame to a time slot in an interchange frame associated with the destination of said block; and a master controller for controlling the first, second and third gateways.

2. The apparatus according to claim 1 wherein the master controller comprises a digital computer for programming the first and second gateways to respond to first and second time slots within the first and second interchange frames, respectively, for programming each third gateway to respond to a destination time slot and an interwork time slot within each of said first and second interchange frames.

3. The apparatus according to claim 1 wherein each third gateway is resident within a Local Switching Office (LSO) of a telecommunications network.

4. The apparatus according to claim 1 wherein at least one second gateway is situated at a customer premises and wherein said at least one second gateway at said customer premises is connected to at least two third gateways to provide fully redundant dual homing for said at least one second gateway.

* * * * *

UNITED STATES PATENT AND TRADEMARK OFFICE
CERTIFICATE OF CORRECTION

PATENT NO. : 5,742,774
DATED : April 21, 1998
INVENTOR(S) : Al-Salamed, DeVito, Francisco, Hersey, Kremer It is certified that error appears in the above-identified patent and that said Letters Patent is hereby corrected as shown below:

On the title page;

Please add--Lucent Technologies Inc., Murray Hill, N.J.--, as assignee for the above-identified patent.

Signed and Sealed this

Eighth Day of September, 1998

*Attest:*

BRUCE LEHMAN

*Attesting Officer*      *Commissioner of Patents and Trademarks*